US011883904B2

(12) United States Patent
Zhou et al.

(10) Patent No.: US 11,883,904 B2
(45) Date of Patent: Jan. 30, 2024

(54) DUAL-WAVELENGTH LASER SYSTEMS AND MATERIAL PROCESSING UTILIZING SUCH SYSTEMS

(71) Applicant: PANASONIC INTELLECTUAL PROPERTY MANAGEMENT CO., LTD, Osaka (JP)

(72) Inventors: Wang-Long Zhou, Andover, MA (US); Francisco Villarreal-Saucedo, Middleton, MA (US); Bien Chann, Merrimack, NH (US); Mark Mordarski, Tewksbury, MA (US); Bryan Lochman, Nashville, TN (US)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 501 days.

(21) Appl. No.: 16/984,489

(22) Filed: Aug. 4, 2020

(65) Prior Publication Data
US 2021/0039200 A1 Feb. 11, 2021

Related U.S. Application Data

(60) Provisional application No. 62/883,189, filed on Aug. 6, 2019.

(51) Int. Cl.
*B23K 26/34* (2014.01)
*B23K 26/0622* (2014.01)
*B23K 103/00* (2006.01)

(52) U.S. Cl.
CPC .......... *B23K 26/34* (2013.01); *B23K 26/0624* (2015.10); *B23K 2103/50* (2018.08)

(58) Field of Classification Search
CPC ........ B23K 26/40; B23K 26/00; B23K 26/34; B23K 26/0624; B23K 20/24
USPC .......................................................... 121/630
See application file for complete search history.

(56) References Cited

U.S. PATENT DOCUMENTS

| 4,857,699 A * | 8/1989 | Duley ................. B23Q 35/128 219/121.84 |
| 6,472,295 B1 | 10/2002 | Morris et al. |
| 2005/0218122 A1* | 10/2005 | Yamamoto ......... B23K 26/0622 219/121.61 |
| 2006/0249487 A1* | 11/2006 | Dunias ................ B23K 26/034 219/121.64 |

(Continued)

FOREIGN PATENT DOCUMENTS

| KR | 10-2013-0090093 A | 8/2013 |
| KR | 10-2015-0028914 A | 3/2015 |

OTHER PUBLICATIONS

Ming Gao et al. Microstructure and tensile behavior of laser arc hybrid welded dissimilar Al and Ti Alloys. Feb. 28, 2014. Materials, 1590-1602, p. 2 last paragraph. (Year: 2014).*

(Continued)

*Primary Examiner* — Nathaniel E Wiehe
*Assistant Examiner* — Spencer H. Kirkwood
(74) *Attorney, Agent, or Firm* — Morgan, Lewis & Bockius LLP

(57) ABSTRACT

In various embodiments, laser beams of two different wavelengths are utilized, sequentially and/or simultaneously, to process workpieces in various processing stages such as melting, piercing, cutting, and welding.

23 Claims, 6 Drawing Sheets

(56) References Cited

U.S. PATENT DOCUMENTS

| | | | |
|---|---|---|---|
| 2011/0222574 A1* | 9/2011 | Chann | G02B 19/0014 |
| | | | 372/100 |
| 2016/0061727 A1* | 3/2016 | Kobayashi | B23K 26/032 |
| | | | 356/445 |
| 2017/0173737 A1* | 6/2017 | Gray | B33Y 50/02 |
| 2020/0295524 A1* | 9/2020 | Magnano | H01S 3/106 |

OTHER PUBLICATIONS

International Search Report and Written Opinion Corresponding to International Application No. PCT/US2020/044827 dated Oct. 30, 2020, 13 pages.

* cited by examiner

DUAL-WAVELENGTH LASER SYSTEMS AND MATERIAL PROCESSING UTILIZING SUCH SYSTEMS

RELATED APPLICATIONS

This application claims the benefit of and priority to U.S. Provisional Patent Application No. 62/883,189, filed Aug. 6, 2019, the entire disclosure of which is hereby incorporated herein by reference.

TECHNICAL FIELD

In various embodiments, the present invention relates to the processing (e.g., welding or cutting) of materials utilizing high-power laser devices emitting at multiple wavelengths.

BACKGROUND

High-power lasers are used in many cutting, etching, annealing, welding, drilling, and soldering applications. As in any materials-processing operations, efficiency can be a critical limiting factor in terms of expense and time; the lower the efficiency, the higher will be the cost and/or the slower will be the operation of the laser deployed to process a given material. The properties of the laser beam can influence efficiency, and different materials (such as copper, aluminum, steel, and so forth) respond differently to beam properties as they are processed. Moreover, the thicknesses of these materials can affect their response. That is, the nature of a cut or weld may vary with the beam properties depending on, at a minimum, the material and its thickness.

In addition, even for the same material and thickness thereof, the optical response (and thus optimal beam) of the material may vary depending upon the geometry of the processing. For example, the optical response of a material during a long straight cut may be different compared to in intricate shape with, e.g., sharp corners or other features.

Furthermore, high-power laser systems often include a laser emitter, the laser light from which is coupled into an optical fiber (or simply a "fiber"), and an optical system that focuses the laser light from the fiber onto the workpiece to be processed. The optical system is typically engineered to produce the highest-quality laser beam, or, equivalently, the beam with the lowest beam parameter product (BPP). The BPP is the product of the laser beam's divergence angle (half-angle) and the radius of the beam at its narrowest point (i.e., the beam waist, the minimum spot size). The BPP quantifies the quality of the laser beam and how well it can be focused to a small spot, and is typically expressed in units of millimeter-milliradians (mm-mrad). (BPP values disclosed herein are in units of mm-mrad unless otherwise indicated.) A Gaussian beam has the lowest possible BPP, given by the wavelength of the laser light divided by pi. The ratio of the BPP of an actual beam to that of an ideal Gaussian beam at the same wavelength is denoted $M^2$, which is a wavelength-independent measure of beam quality.

Wavelength beam combining (WBC) is a technique for scaling the output power and brightness from laser diodes, laser diode bars, stacks of diode bars, or other lasers arranged in a one- or two-dimensional array. WBC methods have been developed to combine beams along one or both dimensions of an array of emitters. Typical WBC systems include a plurality of emitters, such as one or more diode bars, that are combined using a dispersive element to form a multi-wavelength beam. Each emitter in the WBC system individually resonates, and is stabilized through wavelength-specific feedback from a common partially reflecting output coupler that is filtered by the dispersive element along a beam-combining dimension. Exemplary WBC systems are detailed in U.S. Pat. No. 6,192,062, filed on Feb. 4, 2000, U.S. Pat. No. 6,208,679, filed on Sep. 8, 1998, U.S. Pat. No. 8,670,180, filed on Aug. 25, 2011, and U.S. Pat. No. 8,559,107, filed on Mar. 7, 2011, the entire disclosure of each of which is incorporated by reference herein.

While techniques such as WBC have succeeded in producing laser-based systems for a wide variety of applications, materials-processing challenges remain. Specifically, lasers emitting at various different wavelengths may interact with different materials and/or materials with different thicknesses in different manners. For example, different materials absorb laser light differently, and thus optimization of laser systems for multiple operations and/or for multiple different materials is quite difficult. Therefore, there is a need for laser systems optimized for different materials-processing operations and that may be utilized to efficiently process a host of different materials, perform various types of processing, and process workpieces along various different processing paths.

SUMMARY

In accordance with embodiments of the present invention, laser systems emit beams having two or more wavelengths, or two or more wavelength ranges, in order to harness advantages of each wavelength for the optimization of materials processing. (Herein, it is understood that references to different "wavelengths" encompass different "ranges of wavelengths," and the wavelength of a laser corresponds to the primary wavelength thereof.) For example, in various embodiments, a laser system features a primary laser emitting at a relatively longer wavelength (e.g., infrared or near-infrared) utilized for cutting materials (e.g., metallic materials), as well as a secondary laser emitting at a relatively shorter wavelength (e.g., ultraviolet or visible) utilized at least for initial piercing operations at the initiation of cutting. In general, various metals exhibit greater absorption of laser light at shorter wavelengths, at least in the solid state. Thus, shorter-wavelength lasers may be efficiently utilized for piercing operations performed at, for example, the initiation of laser cutting. That is, piercing operations may be performed more quickly, and with higher quality (e.g., edge roughness) with shorter-wavelength lasers. Unfortunately, many short-wavelength lasers (e.g., lasers emitting in the green or blue wavelength range) are less efficient, have shorter lifetimes, are more expensive, and ramp to full power more slowly and/or less easily than various longer-wavelength lasers, such as near-infrared lasers. In addition, once metals are molten, their absorbance of laser light becomes less dependent on, or even independent of, the laser wavelength. Thus, actual cutting operations, once metals are pierced and molten, may be more quickly and efficiently performed by longer-wavelength lasers, which generally have longer lifetimes and exhibit higher efficiency. Such longer-wavelength lasers may be unsuitable for the initial piercing operation, due to (1) lower absorption of the longer wavelengths by the material and/or (2) high reflectivity of the longer wavelengths by the material, which can not only prevent initiation of laser cutting but also lead to damage of the laser system (or various components thereof) by spurious reflections.

In an example cutting operation, a laser is emitted toward the surface of the material, whereupon at least a portion of the laser energy is absorbed, thereby heating the material. After sufficient energy absorption, the surface of the material melts and becomes molten. Thereafter, the sub-surface material also melts, generating a hole in the material. Once such a hole is formed, laser energy may be translated across the material, cutting through the material in a desired pattern. In accordance with various embodiments of the invention, a secondary, smaller-wavelength laser is utilized to initiate a cutting operation. In various embodiments, the secondary laser emits light onto the surface of the material to be processed at least until a portion of the surface of the material is molten. (That is, the secondary laser need not be utilized until the hole is actually generated through the material, so long as at least some of the material is molten and therefore more absorptive to laser light of longer wavelengths; however, in various embodiments, the secondary laser is utilized at least until a hole forms through the material.) After at least a portion of the material surface is molten, the primary laser emits longer-wavelength light onto the material at substantially the same point (i.e., the primary and secondary laser beams may be coaxial, or their optical axes may be closely proximate each other), e.g., within the molten portion of the surface and/or at least partially within any hole formed by the secondary laser, and then translated across the material to produce a cut. Thus, in various embodiments, the secondary laser may be utilized at a lower power and/or for less time, extending its lifetime. Moreover, the use of the secondary laser enables the efficient processing of materials that are highly reflective to longer laser wavelengths (e.g., infrared or near-infrared), such as copper.

In various embodiments, the secondary laser may be utilized (i.e., may emit laser energy toward the material) not only for piercing of the material (e.g., when initiating a cutting operation), but also during the cutting operation if one or more properties of the material change or if it is desired to alter one or more properties of the cut itself. For example, if the thickness of the material changes (e.g., increases) at one or more points, the secondary laser may be utilized at such points to efficiently continue the cutting operation. In addition, the secondary laser may be utilized (with or without the primary laser) at a point where it is desired to alter (e.g., increase) the size (e.g., width) of the cut, and/or at a point where the cutting direction changes.

As detailed above, the primary and secondary lasers may be utilized independently of each other during different portions of the piercing/cutting operation (or other processing operation). That is, the secondary laser may be utilized to initiate the cut and then turned off, whereupon the primary laser may be powered on to complete the operation, and the two lasers do not emit light toward the material simultaneously. However, in various embodiments, both lasers emit light toward the material simultaneously for at least a portion of the processing operation. That is, both lasers may emit light toward the surface during at least a portion of the piercing operation and/or during at least a portion of the subsequent cutting operation. The simultaneous use of both lasers may provide extra laser power, thereby enabling faster cutting and/or the cutting of thicker materials. In addition, the extended bandwidth provided by simultaneous use of both lasers may improve the surface quality of the processed/cut material via increases scrambling of laser coherence and speckle. In various embodiments, both lasers emit light toward the material simultaneously, but the power of one or the other is modulated during one or more portions of the process. For example, during piercing the primary laser may emit light but at a lower power than during the subsequent cutting operation. Similarly, the secondary laser may emit light during cutting, but at a lower power than during the initial piercing operation.

In another exemplary embodiment, the secondary laser may be utilized for initial softening or melting, while the primary laser is utilized to weld a workpiece or a plurality of workpieces along a processing path. The primary and secondary lasers may be operated as detailed above for the example cutting operation.

In various embodiments, the operation of the primary and secondary lasers is controlled by a computer-based controller. In embodiments in which the primary laser is used (or primarily used) for cutting after the secondary laser is used (or primarily used) for piercing, the controller may power on the primary laser (or ramp up its power level) at a desired point in the process (e.g., when at least a portion of the material surface is molten but before a hole is formed in the material, or even after the hole forms in the material). At such time, the controller may power off the secondary laser (or ramp down its power level). The controller may initiate this use of the primary laser directly in response to the state of the material surface (e.g., when it becomes molten). For example, the laser system may include one or more sensors that monitor the material surface and detect when it is molten via changes in, for example, reflectivity and/or temperature of the surface. (As known to those of skill in the art, when a surface becomes molten, this phase change may be accompanied by an abrupt change in reflectivity (e.g., to longer wavelengths such as infrared or near-infrared wavelengths). The temperature rise of the surface of the material may also slow, at least until the material begins to vaporize.) In other embodiments, the controller may simply initiate the use of the primary laser (and/or power down or off the secondary laser) after a timed delay.

Thus, in various embodiments, a secondary, shorter wavelength laser is utilized (or primarily utilized) to melt, pierce, or partially pierce a material and, thereafter, a primary, longer wavelength laser is utilized (or primarily utilized) to cut the material (e.g., via translation of the primary laser spot across the material). In general, the secondary laser may be utilized to initiate a particular process, while the primary laser may be utilized to complete the process after it is initiated. While such embodiments may be particularly suited to metallic materials, in various embodiments the longer wavelength laser is utilized (or primarily utilized) to melt, pierce, or partially pierce a material and, thereafter, the shorter wavelength laser is utilized (or primarily utilized) to cut the material (e.g., via translation of the primary laser spot across the material). For example, many non-metallic materials such as glasses and plastics are transparent at visible and near-IR wavelengths, but may exhibit high absorption at UV wavelengths (e.g., less than approximately 350 nm) and/or IR wavelengths (e.g., ranging from approximately 2 µm to approximately 11 µm). Thus, while such materials may be processed as detailed above and herein, i.e., with the shorter wavelength laser for piercing and/or melting, and the longer wavelength laser for cutting, the laser wavelengths may be selected so that such materials may be processed with the longer wavelength laser used for piercing and/or melting, and the shorter wavelength laser used for cutting. Thus, for such materials, the "secondary laser" as described herein may have a longer wavelength than the "primary laser" in various embodiments. (For example, a primary laser may have a near-IR wavelength while the secondary laser may have a wavelength of approximately 5 µm (e.g., a CO laser) or approximately 10.6 µm (e.g., a $CO_2$ laser)).

Embodiments of the present invention are typically utilized to process a workpiece such that the surface of the workpiece is physically altered and/or such that a feature is formed on or within the surface, in contrast with optical techniques that merely probe a surface with light (e.g., reflectivity measurements). Exemplary processes in accordance with embodiments of the invention include cutting, welding, drilling, and soldering. Various embodiments of the invention also process workpieces at one or more spots or along a one-dimensional processing path, rather than simultaneously flooding all or substantially all of the workpiece surface with radiation from the laser beam. In general, processing paths may be curvilinear or linear, and "linear" processing paths may feature one or more directional changes, i.e., linear processing paths may be composed of two or more substantially straight segments that are not necessarily parallel to each other.

Herein, "optical elements" may refer to any of lenses, mirrors, prisms, gratings, and the like, which redirect, reflect, bend, or in any other manner optically manipulate electromagnetic radiation, unless otherwise indicated. Herein, beam emitters, emitters, or laser emitters, or lasers include any electromagnetic beam-generating device such as semiconductor elements, which generate an electromagnetic beam, but may or may not be self-resonating. These also include fiber lasers, disk lasers, non-solid state lasers, etc. Generally, each emitter includes a back reflective surface, at least one optical gain medium, and a front reflective surface. The optical gain medium increases the gain of electromagnetic radiation that is not limited to any particular portion of the electromagnetic spectrum, but that may be visible, infrared, and/or ultraviolet light. An emitter may include or consist essentially of multiple beam emitters such as a diode bar configured to emit multiple beams. The laser beams utilized in the embodiments herein may be single-wavelength or multi-wavelength beams combined using various techniques known in the art. In addition, references to "lasers," "laser emitters," or "beam emitters" herein include not only single-diode lasers, but also diode bars, laser arrays, diode bar arrays, and single or arrays of vertical cavity surface-emitting lasers (VCSELs).

Embodiments of the invention may be utilized with wavelength beam combining (WBC) systems that include a plurality of emitters, such as one or more diode bars, that are combined using a dispersive element to form a multi-wavelength beam. Each emitter in the WBC system individually resonates, and is stabilized through wavelength-specific feedback from a common partially reflecting output coupler that is filtered by the dispersive element along a beam-combining dimension. Exemplary WBC systems are detailed in U.S. Pat. No. 6,192,062, filed on Feb. 4, 2000, U.S. Pat. No. 6,208,679, filed on Sep. 8, 1998, U.S. Pat. No. 8,670,180, filed on Aug. 25, 2011, and U.S. Pat. No. 8,559,107, filed on Mar. 7, 2011, the entire disclosure of each of which is incorporated by reference herein. Multi-wavelength output beams of WBC systems may be utilized as processing beams in embodiments of the present invention for, e.g., piercing and/or cutting and/or welding of a workpiece.

Laser systems in accordance with various embodiments of the present invention may also include a delivery mechanism that directs the laser output onto the workpiece while causing relative movement between the output and the workpiece. For example, the delivery mechanism may include, consist essentially of, or consist of a laser head for directing and/or focusing the output toward the workpiece. The laser head may itself be movable and/or rotatable relative to the workpiece, and/or the delivery mechanism may include a movable gantry or other platform for the workpiece to enable movement of the workpiece relative to the output, which may be fixed in place.

Embodiments of the present invention may utilize laser heads and/or related system components that enable delivery of asymmetric laser beams to workpieces and/or rotate beams during workpiece processing, if desired, as described in U.S. Provisional Patent Application No. 62/954,033, filed on Dec. 27, 2019, the entire disclosure of which is incorporated by reference herein. For example, the primary beam, the secondary beam, or both, may be rotated (e.g., continuously, to a particular orientation, or with a desired angle to (e.g., parallel to, perpendicular to, etc.) a processing path whose direction may change one or more times across the workpiece) by the laser head during all or portions of the various processing stages detailed herein. For example, beam rotation during one or more processing stages may speed the process or produce sharper processed workpiece edges.

In various embodiments of the present invention, the primary and secondary laser beams utilized for processing of various workpieces may be delivered to the workpiece via one or more optical fibers (or "delivery fibers"). Embodiments of the invention may incorporate optical fibers having many different internal configurations and geometries. Such optical fibers may have one or more core regions and one or more cladding regions. For example, the optical fiber may include, consist essentially of, or consist of a central core region and an annular core region separated by an inner cladding layer. One or more outer cladding layers may be disposed around the annular core region. Embodiments of the invention may be utilized with and/or incorporate optical fibers having configurations described in U.S. patent application Ser. No. 15/479,745, filed on Apr. 5, 2017, and U.S. patent application Ser. No. 16/675,655, filed on Nov. 6, 2019, the entire disclosure of each of which is incorporated by reference herein.

Structurally, optical fibers in accordance with embodiments of the invention may include one or more layers of high and/or low refractive index beyond (i.e., outside of) an exterior cladding without altering the principles of the present invention. Various ones of these additional layers may also be termed claddings or coatings, and may not guide light. Optical fibers may also include one or more cores in addition to those specifically mentioned. Such variants are within the scope of the present invention. Various embodiments of the invention do not incorporate mode strippers in or on the optical fiber structure. Similarly, the various layers of optical fibers in accordance with embodiments of the invention are continuous along the entire length of the fiber and do not contain holes, photonic-crystal structures, breaks, gaps, or other discontinuities therein.

Optical fibers in accordance with the invention may be multi-mode fibers and therefore support multiple modes therein (e.g., more than three, more than ten, more than 20, more than 50, or more than 100 modes). In addition, optical fibers in accordance with the invention are generally passive fibers, i.e., are not doped with active dopants (e.g., erbium, ytterbium, thulium, neodymium, dysprosium, praseodymium, holmium, or other rare-earth metals) as are typically utilized for pumped fiber lasers and amplifiers. Rather, dopants utilized to select desired refractive indices in various layers of fibers in accordance with the present invention are generally passive dopants that are not excited by laser light, e.g., fluorine, titanium, germanium, and/or boron. Thus, optical fibers, and the various core and cladding layers thereof in accordance with various embodiments of the invention may include, consist essentially of, or consist of glass, such as substantially pure fused silica and/or fused silica, and may be doped with fluorine, titanium, germanium, and/or boron. Obtaining a desired refractive index for a particular layer or region of an optical fiber in accordance with embodiments of the invention may be accomplished (by techniques such as doping) by one of skill in the art without undue experimentation. Relatedly, optical fibers in accordance with embodiments of the invention may not incorporate reflectors or partial reflectors (e.g., grating such as Bragg gratings) therein or thereon. Fibers in accordance with embodiments of the invention are typically not pumped with pump light configured to generate laser light of a different wavelength. Rather, fibers in accordance with embodiments of the invention merely propagate light along their lengths without changing its wavelength. Optical fibers utilized in various embodiments of the invention may feature an optional external polymeric protective coating or sheath disposed around the more fragile glass or fused silica fiber itself.

In addition, systems and techniques in accordance with embodiments of the present invention are typically utilized for materials processing (e.g., cutting, drilling, etc.), rather than for applications such as optical communication or optical data transmission. Thus, laser beams, which may be coupled into fibers in accordance with embodiments of the invention, may have wavelengths different from the 1.3 µm or 1.5 µm utilized for optical communication. In fact, fibers utilized in accordance with embodiments of the present invention may exhibit dispersion at one or more (or even all) wavelengths in the range of approximately 1260 nm to approximately 1675 nm utilized for optical communication.

In an aspect, embodiments of the invention feature a method of processing a workpiece utilizing a laser system. The laser system includes, consists essentially of, or consists of a primary laser configured to emit a primary laser beam and a secondary laser configured to emit a secondary laser beam. A wavelength of the primary laser beam is different from a wavelength of the secondary laser beam. During a first stage, at least the secondary laser beam is directed to a surface of the workpiece, whereby energy of the secondary laser beam is absorbed by the workpiece. During a second stage after at least a portion of the surface of the workpiece reacts to absorption of energy of the secondary laser beam during the first stage, (i) at least the primary laser beam is directed to the surface of the workpiece, and (ii) thereduring, relative movement is caused between at least the primary laser beam and the workpiece, whereby the workpiece is cut or welded along a processing path determined at least in part by the relative movement.

Embodiments of the invention may include one or more of the following in any of a variety of combinations. The primary laser beam may not be directed to the surface of the workpiece during the first stage. The secondary laser beam may not be directed to the surface of the workpiece during the second stage. The primary laser beam may be directed to the surface of the workpiece during the first stage. An output power of the primary laser beam during the first stage may be lower than an output power of the primary laser beam during the second stage. The secondary laser beam may be directed to the surface of the workpiece during the second stage. An output power of the secondary laser beam during the second stage may be lower than an output power of the secondary laser beam during the first stage.

The wavelength of the primary laser beam may range from approximately 870 nm to approximately 11 µm. The wavelength of the primary laser beam may range from approximately 870 nm to approximately 1064 nm. The wavelength of the primary laser beam may range from approximately 870 nm to approximately 1000 nm. The wavelength of the secondary laser beam may range from approximately 300 nm to approximately 810 nm. The wavelength of the secondary laser beam may range from approximately 400 nm to approximately 810 nm. The wavelength of the secondary laser beam may range from approximately 530 nm to approximately 810 nm.

The wavelength of the primary laser beam may be longer than the wavelength of the secondary laser beam. The workpiece (or at least a portion thereof, or at least a portion of a surface thereof) may include, consist essentially of, or consist of a metallic material. The workpiece (or at least a portion thereof, or at least a portion of a surface thereof) may include, consist essentially of, or consist of aluminum, copper, iron, steel, gold, silver, and/or molybdenum. The wavelength of the primary laser beam may be shorter than the wavelength of the secondary laser beam. The workpiece (or at least a portion thereof, or at least a portion of a surface thereof) may include, consist essentially of, or consist of a non-metallic material. The workpiece (or at least a portion thereof, or at least a portion of a surface thereof) may include, consist essentially of, or consist of glass and/or plastic and/or paper and/or a polymeric material. An absorption, of the workpiece in the solid state, of the wavelength of the primary laser beam may be less than 50%, less than 40%, less than 30%, less than 20%, less than 10%, less than 5%, less than 2%, or less than 1%.

The primary laser beam may be a multi-wavelength beam. The primary laser beam may be emitted by a wavelength-beam combined (or combining) beam emitter. The wavelength-beam combined (or combining) beam emitter may include, consist essentially of, or consist of one or more beam sources emitting a plurality of discrete beams, focusing optics for focusing the plurality of beams toward a dispersive element, the dispersive element for receiving and dispersing the received focused beams, and a partially reflective output coupler positioned to receive the dispersed beams, transmit a first portion of the dispersed beams therethrough as the primary laser beam, and reflect a second portion of the dispersed beams back toward the dispersive element. The dispersive element may include, consist essentially of, or consist of a diffraction grating (e.g., a transmissive diffraction grating or a reflective diffraction grating). The primary laser beam may be a multi-wavelength beam. The secondary laser beam may be emitted by a wavelength-beam combined (or combining) beam emitter. The wavelength-beam combined (or combining) beam emitter may include, consist essentially of, or consist of one or more beam sources emitting a plurality of discrete beams, focusing optics for focusing the plurality of beams toward a dispersive element, the dispersive element for receiving and dispersing the received focused beams, and a partially reflective output coupler positioned to receive the dispersed beams, transmit a first portion of the dispersed beams therethrough as the secondary laser beam, and reflect a second portion of the dispersed beams back toward the dispersive element. The dispersive element may include, consist essentially of, or consist of a diffraction grating (e.g., a transmissive diffraction grating or a reflective diffraction grating).

The primary laser beam may be emitted by a fiber laser, a direct-diode laser, or a solid-state laser. The secondary laser beam may be emitted by a gas laser, a direct-diode laser, or a solid-state laser. The primary laser beam and the secondary laser beam may be emitted by different types of lasers. The primary laser beam and the secondary laser beam may be emitted by the same type of laser. Before the second stage is initiated, it may be determined that the at least a portion of the surface of the workpiece is molten based on a reflectivity and/or a temperature of the surface of the workpiece. During or after the second stage, at least the secondary laser beam may be directed to the surface of the workpiece at one or more points along the processing path at which (i) a thickness of the workpiece changes, (ii) a direction of the processing path changes, and/or (iii) a composition of the workpiece changes. At such points, the primary laser beam may be directed to the surface of the workpiece or not directed to the surface of the workpiece. At one or more such points, the second stage may end and the first stage may be initiated again. A hole may be formed through at least a portion of (or even an entirety of) a thickness of the workpiece during the first stage and before the second stage. A hole may not be formed through at least a portion of (or even an entirety of) a thickness of the workpiece before initiation of the second stage.

In another aspect, embodiments of the invention feature a laser system for processing a workpiece. The laser system includes, consists essentially of, or consists of a primary laser emitter, a secondary laser emitter, a laser head, and a computer-based controller. The primary laser emitter is configured to emit a primary laser beam. The secondary laser emitter is configured to emit a secondary laser beam. A wavelength of the primary laser beam is different from a wavelength of the secondary laser beam. The laser head directs the primary laser beam and/or the secondary laser beam onto the workpiece. The controller is configured to (i) during a first stage, direct at least the secondary laser beam to a surface of the workpiece, whereby energy of the secondary laser beam is absorbed by the workpiece, and (ii) during a second stage after at least a portion of the surface of the workpiece reacts to absorption of energy of the secondary laser beam, direct at least the primary laser beam to the surface of the workpiece during relative movement therebetween, whereby the workpiece is cut or welded along a processing path determined at least in part by the relative movement.

Embodiments of the invention may include one or more of the following in any of a variety of combinations. The system may include a beam combiner for combining the primary laser beam and the secondary laser beam. The beam combiner may be disposed within or disposed optically upstream of the laser head. The beam combiner may include, consist essentially of, or consist of a wavelength combiner, a polarization combiner, a spatial combiner, or a fiber combiner. The system may include a delivery optical fiber into which the beam combiner combines the primary laser beam and the secondary laser beam. The delivery optical fiber may deliver the primary laser beam and the secondary laser beam to the laser head. The laser head may include, consist essentially of, or consist of one or more optical elements for focusing the primary laser beam and/or the secondary laser beam and/or the combined beam onto the workpiece.

The controller may be configured to not direct the primary laser beam to the surface of the workpiece during the first stage. The controller may be configured to not direct the secondary laser beam to the surface of the workpiece during the second stage. The controller may be configured to direct the primary laser beam to the surface of the workpiece during the first stage. The controller may be configured to direct the primary laser beam to the surface of the workpiece (i) during the first stage with a first output power and (ii) during the second stage with a second output power higher than the first output power. The controller may be configured to direct the secondary laser beam to the surface of the workpiece during the second stage. The controller may be configured to direct the secondary laser beam to the surface of the workpiece (i) during the first stage with a first output power and (ii) during the second stage with a second output power lower than the first output power.

The wavelength of the primary laser beam may range from approximately 870 nm to approximately 11 μm. The wavelength of the primary laser beam may range from approximately 870 nm to approximately 1064 nm. The wavelength of the primary laser beam may range from approximately 870 nm to approximately 1000 nm. The wavelength of the secondary laser beam may range from approximately 300 nm to approximately 810 nm. The wavelength of the secondary laser beam may range from approximately 400 nm to approximately 810 nm. The wavelength of the secondary laser beam may range from approximately 530 nm to approximately 810 nm.

The system may include the workpiece. The workpiece may include, consist essentially of, or consist of a metallic material. The workpiece may include, consist essentially of, or consist of aluminum, copper, iron, steel, gold, silver, and/or molybdenum. The controller may be configured to process a workpiece including, consisting essentially of, or consisting of a metallic material. The workpiece may include, consist essentially of, or consist of a non-metallic material. The workpiece may include, consist essentially of, or consist of glass and/or plastic and/or paper and/or a polymeric material. The controller may be configured to process a workpiece including, consisting essentially of, or consisting of a non-metallic material. An absorption, of the workpiece in the solid state, of the wavelength of the primary laser beam may be less than 50%, less than 40%, less than 30%, less than 20%, less than 10%, less than 5%, less than 2%, or less than 1%. The wavelength of the primary laser beam may be longer than the wavelength of the secondary laser beam. The wavelength of the primary laser beam may be shorter than the wavelength of the secondary laser beam.

The primary laser beam may be a multi-wavelength beam. The primary laser beam may be emitted by a wavelength-beam combined (or combining) beam emitter. The wavelength-beam combined (or combining) beam emitter may include, consist essentially of, or consist of one or more beam sources emitting a plurality of discrete beams, focusing optics for focusing the plurality of beams toward a dispersive element, the dispersive element for receiving and dispersing the received focused beams, and a partially reflective output coupler positioned to receive the dispersed beams, transmit a first portion of the dispersed beams therethrough as the primary laser beam, and reflect a second portion of the dispersed beams back toward the dispersive element. The dispersive element may include, consist essentially of, or consist of a diffraction grating (e.g., a transmissive diffraction grating or a reflective diffraction grating). The primary laser beam may be a multi-wavelength beam. The secondary laser beam may be emitted by a wavelength-beam combined (or combining) beam emitter. The wavelength-beam combined (or combining) beam emitter may include, consist essentially of, or consist of one or more beam sources emitting a plurality of discrete beams, focusing optics for focusing the plurality of beams toward a dispersive element, the dispersive element for receiving and dispersing the received focused beams, and a partially reflective output coupler positioned to receive the dispersed beams, transmit a first portion of the dispersed beams therethrough as the secondary laser beam, and reflect a second portion of the dispersed beams back toward the dispersive element. The dispersive element may include, consist essentially of, or consist of a diffraction grating (e.g., a transmissive diffraction grating or a reflective diffraction grating).

The system may include a primary beam emitter configured to emit the primary laser beam. The primary beam emitter may include, consist essentially of, or consist of a fiber laser, a direct-diode laser, or a solid-state laser. The system may include a secondary beam emitter configured to emit the secondary laser beam. The secondary beam emitter may include, consist essentially of, or consist of a gas laser, a direct-diode laser, or a solid-state laser. The system may include one or more sensors. The controller may be configured to determine that the at least a portion of the surface of the workpiece is molten based at least in part on signals received from the one or more sensors. The one or more sensors may include, consist essentially of, or consist of one or more optical sensors and/or one or more temperature sensors. The controller may be configured to, during the second stage, direct at least the secondary laser beam to the surface of the workpiece at one or more points along the processing path at which (i) a thickness of the workpiece changes, (ii) a direction of the processing path changes, and/or (iii) a composition of the workpiece changes. At such points, the controller may be configured to direct or to not direct the primary laser beam to the surface of the workpiece. At one or more such points, controller may be configured to end the second stage and initiate the first stage again. The controller may be configured to initiate the second stage only after a hole is formed through a portion of or the entire thickness of the workpiece during the first stage. The controller may be configured to initiate the second stage before a hole is formed through a portion of or the entire thickness of the workpiece during the first stage.

In yet another aspect, embodiments of the invention feature a method of processing a workpiece utilizing a laser system. The laser system includes, consists essentially of, or consists of a laser head. At least a secondary laser beam from the laser head is directed to a surface of the workpiece to melt or at least partially pierce the workpiece at a first location. At least a primary laser beam, different from the secondary laser beam, is directed from the laser head to the workpiece while causing relative movement therebetween to cut or weld the workpiece along a processing path extending from the first location. A wavelength of the primary laser beam is different from a wavelength of the secondary laser beam.

Embodiments of the invention may include one or more of the following in any of a variety of combinations. The wavelength of the primary laser beam may be longer than the wavelength of the secondary laser beam. The workpiece, or at least a portion of the surface of the workpiece, or at least a portion of the workpiece, may include, consist essentially of, or consist of a metallic material. The workpiece, or at least a portion of the surface of the workpiece, or at least a portion of the workpiece, may include, consist essentially of, or consist of aluminum, copper, iron, steel, gold, silver, and/or molybdenum. The wavelength of the primary laser beam may be shorter than the wavelength of the secondary laser beam. The workpiece, or at least a portion of the surface of the workpiece, or at least a portion of the workpiece, may include, consist essentially of, or consist of a non-metallic material. The workpiece, or at least a portion of the surface of the workpiece, or at least a portion of the workpiece, may include, consist essentially of, or consist of a glass, a plastic, paper, and/or a polymeric material.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the term "substantially" means ±10%, and in some embodiments, ±5%. The term "consists essentially of" means excluding other materials that contribute to function, unless otherwise defined herein. Nonetheless, such other materials may be present, collectively or individually, in trace amounts. Herein, the terms "radiation" and "light" are utilized interchangeably unless otherwise indicated. Herein, "downstream" or "optically downstream," is utilized to indicate the relative placement of a second element that a light beam strikes after encountering a first element, the first element being "upstream," or "optically upstream" of the second element. Herein, "optical distance" between two components is the distance between two components that is actually traveled by light beams; the optical distance may be, but is not necessarily, equal to the physical distance between two components due to, e.g., reflections from mirrors or other changes in propagation direction experienced by the light traveling from one of the components to the other. Distances utilized herein may be considered to be "optical distances" unless otherwise specified.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
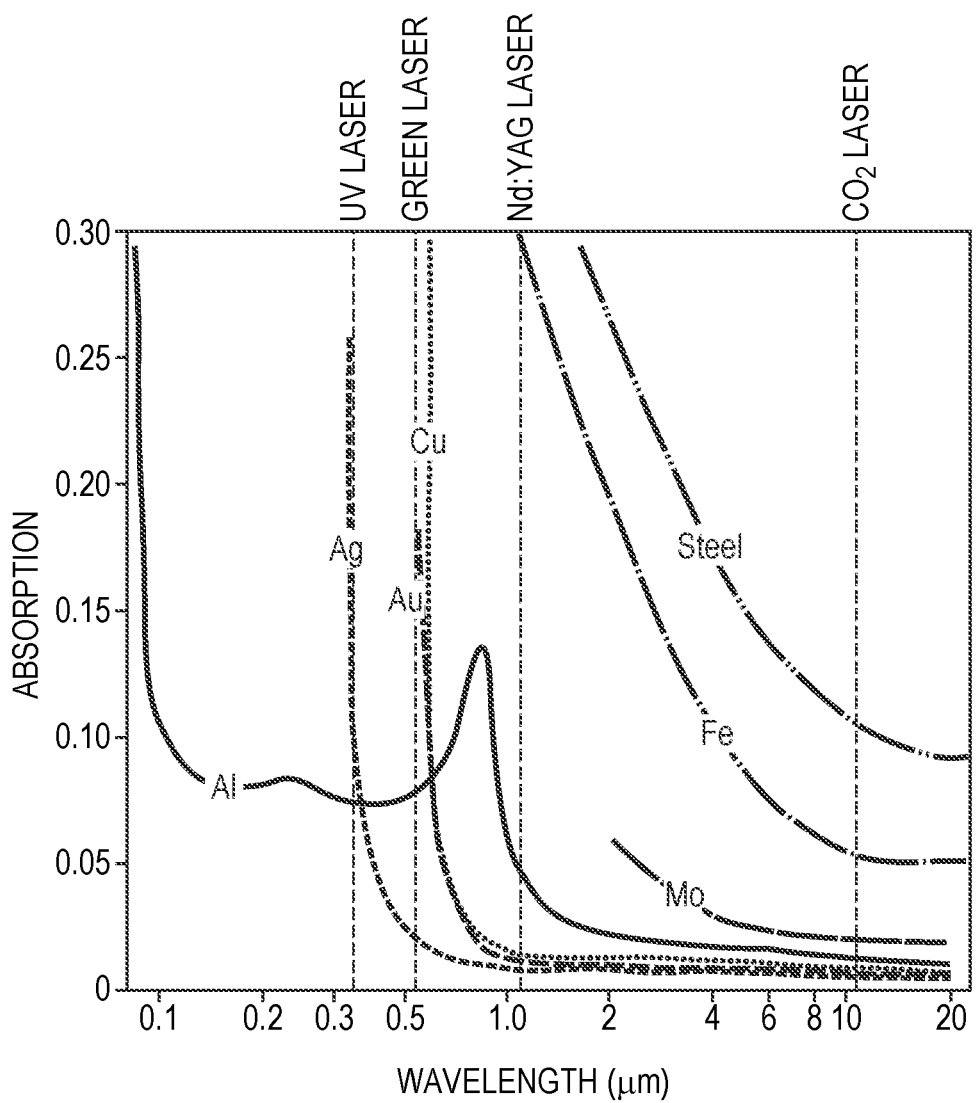
FIG. 1 is a graph of the absorption spectra of various metallic materials processable in accordance with embodiments of the present invention as a function of the wavelength of laser processing light.

FIG. 1 is a graph of the absorption spectra of various metallic materials processable in accordance with embodiments of the present invention as a function of the wavelength of laser processing light. FIG. 1 is adapted from W.

M. Steen and J. Mazumder, "Laser Material Processing," 4th Edition, Springer, London, 2010. doi:10.1007/978-1-84996-062-5, the entire disclosure of which is incorporated by reference herein. As shown, at least in the solid state, the absorption of most metals increases as the laser wavelength decreases. Notably, aluminum has an absorption peak at approximately 810 nm, and metals such as copper, gold, and silver are very reflective and exhibit very low absorption at near-infrared wavelengths and beyond (e.g., at wavelengths of approximately 800 nm or 1000 nm and higher). Also shown on FIG. 1 are the approximate emission wavelengths of various types of lasers, e.g., a UV laser emitting at approximately 350 nm, a green laser emitting at approximately 500 nm, a Nb:YAG laser emitting at 1060 nm, and a $CO_2$ laser emitting at 10.6 µm.

Figure 2:
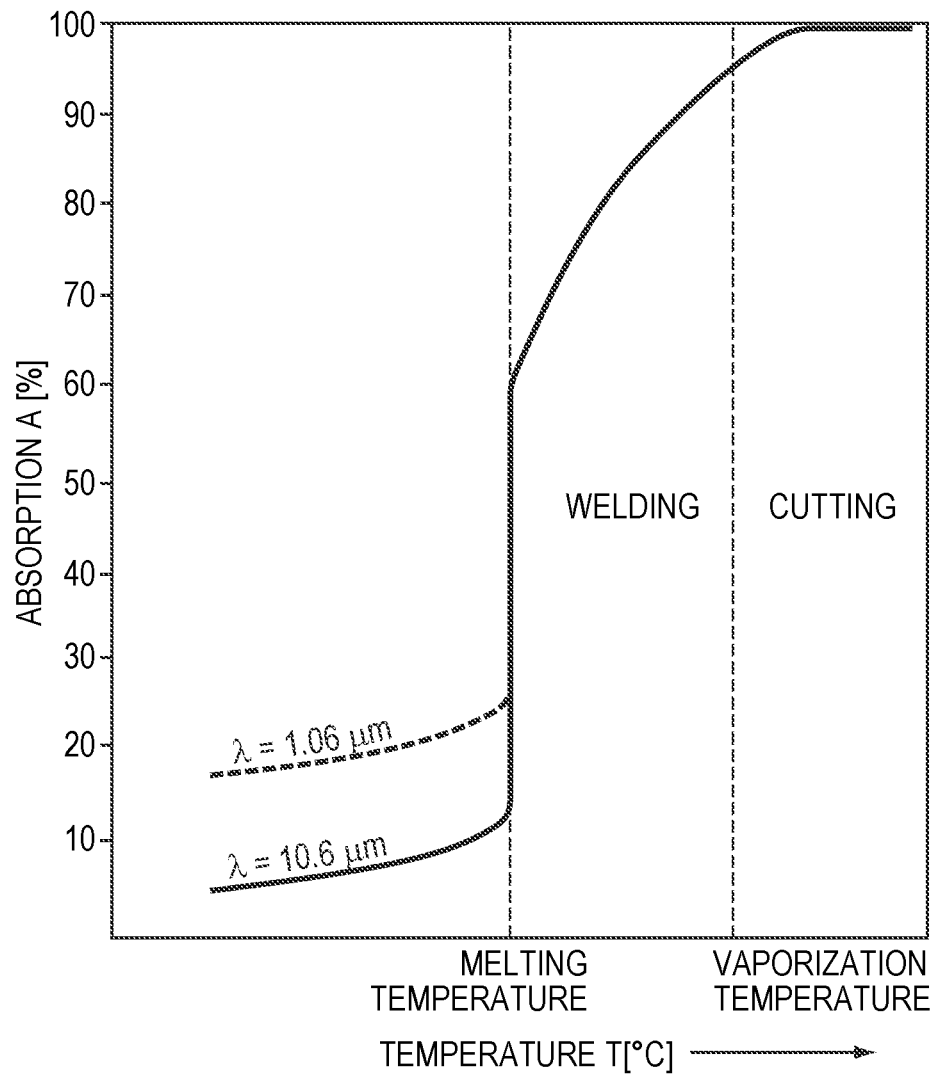
FIG. 2 is a graph of absorption of a steel surface as a function of temperature for laser light of two different wavelengths, 1060 nm and 10.6 µm.

FIG. 2 is a graph of absorption of a typical metal surface (here, steel) as a function of temperature for laser light of two different wavelengths, 1060 nm and 10.6 µm. FIG. 2 is taken from page 462, FIG. 6.23, of the Steel Heat Treatment Handbook, 2nd edition, CRC Press (2006), the entire disclosure of which is incorporated by reference herein. As shown, below the melting point of the material, the absorption is significantly higher for the shorter-wavelength light. However, when the melting point is reached and the surface begins to melt, the absorption increases significantly and becomes less dependent on, or even substantially independent of, wavelength. As shown, welding processes may be performed in this relative temperature regime. The absorption continues to increase as the temperature increases to the vaporization temperature (e.g., the regime where cutting may be performed), whereupon the absorption tends to level off at a significant level. Thus, embodiments of the invention utilize a secondary, shorter-wavelength laser for initiation of a cutting or welding operation (e.g., piercing and/or at least partially melting) when the material is in the solid state, and, once the material is molten, a primary, longer-wavelength laser is utilized for processes such as cutting or welding of the material.

While the above-described embodiments may be particularly suited to metallic materials, in various embodiments the longer wavelength laser is utilized (or primarily utilized) to melt, pierce, or partially pierce a material and, thereafter, the shorter wavelength laser is utilized (or primarily utilized) to cut the material (e.g., via translation of the primary laser spot across the material). For example, many non-metallic materials such as glasses and plastics are transparent at visible and near-IR wavelengths, but may exhibit high absorption at UV wavelengths (e.g., less than approximately 350 nm) and/or IR wavelengths (e.g., ranging from approximately 2 µm to approximately 11 µm). Thus, while such materials may be processed as detailed above and herein, i.e., with the shorter wavelength laser for piercing and/or melting, and the longer wavelength laser for cutting, the laser wavelengths may be selected so that various materials (e.g., glass, plastic, paper) may be processed with the longer wavelength laser used for piercing and/or melting, and the shorter wavelength laser used for cutting. Thus, for such materials, the "secondary laser" as described herein may have a longer wavelength than the "primary laser" in various embodiments. (For example, a primary laser may have a near-IR wavelength while the secondary laser may have a wavelength of approximately 5 µm (e.g., a CO laser) or approximately 10.6 µm (e.g., a $CO_2$ laser)).

Figure 3:
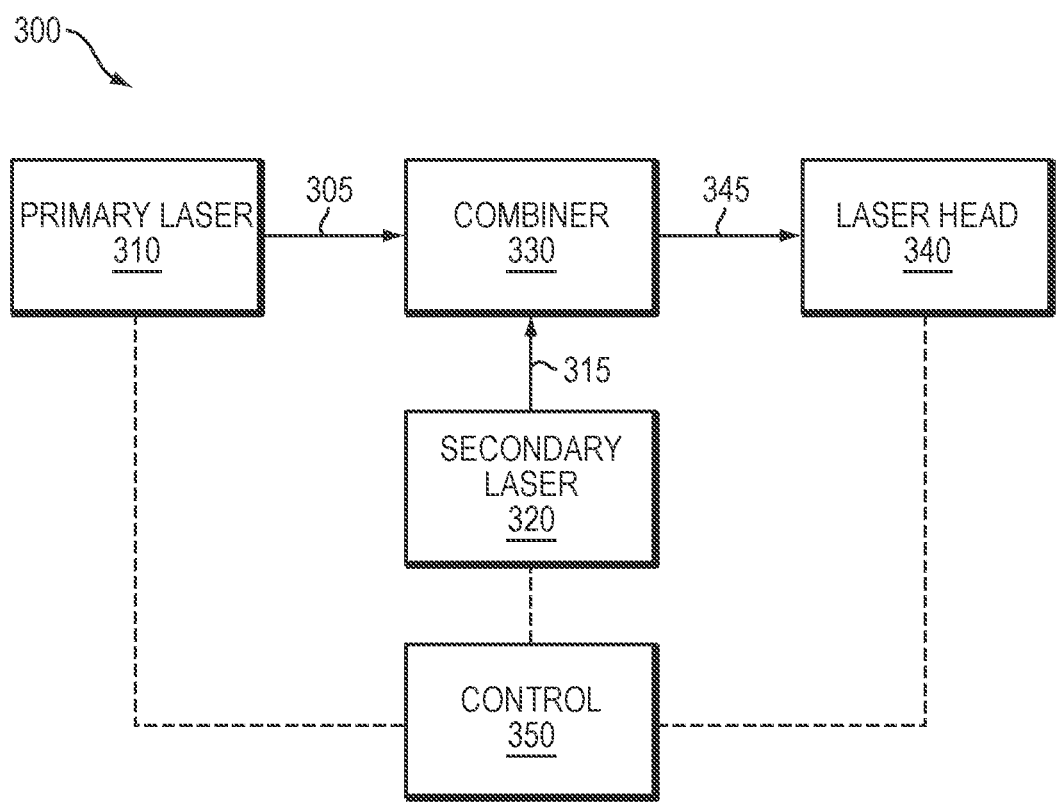
FIG. 3 is a schematic diagram of various components of a laser system in accordance with embodiments of the present invention.

FIG. 3 schematically depicts various components of a laser system 300 in accordance with embodiments of the present invention. As shown, in laser system 300, the beam 305 from a primary laser 310 and the beam 315 from a secondary laser 320 are combined at a combiner (or "combining module") 330. The combiner 330 is coupled to a laser head 340 via an optical connection 345 (e.g., one or more optical fibers). The combiner 330 is configured to receive the beams 305, 315 and combine the beams so that they may be emitted coaxially or in close proximity to each other. In various embodiments, beams in close proximity to each other may strike the surface so that at least a portion of their beam energy overlaps, or so that at least a portion of the beam energy of the second beam strikes the surface where the beam energy of the first beam struck the surface, or at least at a point on the surface that has been rendered at least partially molten by the first beam. In various embodiments, the centers of the two beams may be coaxial or spaced apart by no more than 1 cm, 0.5 cm, 0.1 cm, 0.5 mm, or 0.1 mm.

As detailed further below, in various embodiments of the invention the combiner 330 may spatially combine the beams, fiber combine the beams, polarization combine the beams, or wavelength combine the beams. In various embodiments, the laser head 340 contains one or more optical elements utilized to focus the beams (and/or the combined beam) onto a workpiece for processing thereof. For example, laser heads in accordance with embodiments of the invention may include one or more collimators (i.e., collimating lenses) and/or focusing optics (e.g., one or more focusing lenses). A laser head may not include a collimator if the beam(s) entering the laser head are already collimated. Laser heads in accordance with various embodiments may also include one or more protective window, a focus-adjustment mechanism (manual or automatic, e.g., one or more dials and/or switches and/or selection buttons). Laser heads may also include one or more monitoring systems for, e.g., laser power, target material temperature and/or reflectivity, plasma spectrum, etc. A laser head may also include optical elements for beam shaping and/or adjustment of beam quality (e.g., variable BPP) and may also include control systems for polarization of the beam and/or the trajectory of the focusing spot.

In some embodiments, all or some of the components of the combiner 330 are contained within the laser head 340. In various embodiments, the laser head 340 may include one or more optical elements (e.g., lenses) and a lens manipulation system for selection and/or positioning thereof for, e.g., alteration of beam shape and/or BPP of the output beam, as detailed in U.S. patent application Ser. No. 15/188,076, filed on Jun. 21, 2016, the entire disclosure of which is incorporated by reference herein.

In embodiments in which the optical connection 345 includes, consists essentially of, or consists of an optical fiber, the optical fiber may have many different internal configurations and geometries. For example, the optical fiber may include, consist essentially of, or consist of a central core region and an annular core region separated by an inner cladding layer. One or more outer cladding layers may be disposed around the annular core region. Embodiments of the invention may incorporate optical fibers having configurations described in U.S. patent application Ser. No. 15/479,745, filed on Apr. 5, 2017, and U.S. Provisional Patent Application No. 62/758,731, filed on Nov. 12, 2018, the entire disclosure of each of which is incorporated by reference herein.

In various embodiments, the primary laser 310 emits a laser beam 305 having a longer wavelength (or range of wavelengths) than the laser beam 315 emitted by the secondary laser 320. In various embodiments, the primary laser 310 is less expensive, less expensive to operate, and/or more widely available. The primary laser 310 may also be configured to operate at a higher maximum power than the secondary laser 320. In various embodiments, the secondary laser 320 may be less efficient, have a shorter lifetime, and be more costly (e.g., in terms of cost per output power).

In various embodiments, the primary and secondary lasers 310, 320 may be different types of lasers, although they need not be. For example, the primary laser 310 may include, consist essentially of, or consist of a direct-diode laser (e.g., emitting in free space or coupled into an optical fiber), a fiber laser, or a solid-state laser (i.e., a laser utilizing a solid gain medium such as a glass or crystal doped with one or more rare-earth elements). In various embodiments, the secondary laser 320 may include, consist essentially of, or consist of a direct-diode laser (e.g., emitting in free space or coupled into an optical fiber), a gas laser, or a solid-state laser. In various embodiments, direct-diode WBC lasers may be preferred for the primary laser 310 and/or the secondary laser 320 due to their capability to process materials (e.g., metallic materials) with higher quality. Without wishing to be bound by theory, WBC lasers may provide better quality due to their broadband nature resulting from the combination of tens (or even hundreds) of discrete emitters each having a different wavelength—this may scramble laser coherence and speckle while smoothing the laser intensity profile in both the spatial domain and the time domain.

Thus, as detailed herein, either or both of the primary laser 310 and secondary laser 320 may emit multi-wavelength beams. In accordance with embodiments of the invention, the "wavelength" or "primary wavelength" of such a multi-wavelength beam may correspond to the central (i.e., middle) and/or most intense wavelength emitted by the laser. As known to those of skill in the art, virtually all laser outputs include a band of multiple wavelengths, although laser wavelength bands tend to be quite narrow. For example, a fiber laser emitting at 1064 nm may have a very narrow band of about 2 nm, while a WBC direct-diode laser emitting at 970 nm may have a band of about 40 nm.

Although example embodiments detailed herein utilize and describe separate primary and secondary lasers 310, 320 for emission of the laser beams 305, 315, in various embodiments the laser beams 305, 315 may be generated using the same laser source. For example, a laser source configured to emit laser beam 305 having a longer wavelength may be utilized to also generate the laser beam 315 having a shorter wavelength via frequency doubling (i.e., second harmonic generation (SHG)). In various embodiments, the laser beam 305 may be utilized for processing as detailed herein, and it may also be directed through a nonlinear optical material, which generates SHG radiation having a wavelength approximately one-half of that of the laser beam 305, to thereby generate the laser beam 315. (While such embodiments have the advantage of requiring only a single laser source, since they utilize SHG such embodiments are restricted to having the wavelength of one laser beam be approximately one-half that of the other laser beam.) In various embodiments, the nonlinear optical material may be moved into and out of the beam path of laser beam 305 as needed for the generation of laser beam 315, and/or the laser beam not currently needed for processing (if any) may be directed away using optical elements such as beam splitters or dichroic mirrors. In various embodiments, laser systems may include mechanisms for orienting the nonlinear optical crystal (e.g., a movable and/or rotatable mount) and/or for controlling its temperature (e.g., a heater or furnace) to, e.g., increase conversion efficiency and/or prevent absorption of moisture.

In various embodiments, an unconverted portion of laser beam 305 traverses the nonlinear optical material during generation of laser beam 315, and both laser beams 305, 315 may be utilized directly from the nonlinear optical material for processing as detailed herein. In a non-limiting example, the laser source may be a YAG or fiber laser emitting a laser beam 305 at approximately 1064 nm, which generates a SHG laser beam 315 having a wavelength of approximately 532 nm.

In various embodiments, the nonlinear optical material may include, consist essentially of, or consist of one or more borate crystals such as β-barium borate (β-$BaB_2O_4$, or BBO), lithium triborate ($LiB_3O_5$, or LBO), cesium lithium borate (CLBO, $CsLiB_6O_{10}$), bismuth triborate ($BiB_3O_6$, or BIBO), or cesium borate ($CsB_3O_5$, or CBO). Other exemplary nonlinear optical crystals include potassium fluoroboratoberyllate ($KBe_2BO_3F_2$, or KBBF), lithium tetraborate ($Li_2B_4O_7$, or LB4), lithium rubidium tetraborate ($LiRbB_4O_7$, or LRB4), and magnesium barium fluoride ($MgBaF_4$). Suitable nonlinear optical materials are available commercially and may be provided by one of skill in the art without undue experimentation.

In various embodiments, the laser beam 305 of the primary laser 310 has a wavelength (or range of wavelengths) ranging from approximately 780 nm to approximately 11 μm, from approximately 780 nm to approximately 1064 nm, from approximately 780 nm to approximately 1000 nm, approximately 870 nm to approximately 11 μm, from approximately 870 nm to approximately 1064 nm, or from approximately 870 nm to approximately 1000 nm. In particular embodiments, the wavelength (or primary or center wavelength) of laser beam 305 may be, for example, approximately 1064 nm, approximately 10.6 μm, approximately 970 nm, approximately 780 or 850 to approximately 1060 nm, or approximately 950 nm to approximately 1070 nm. In various embodiments, the laser beam 315 of the secondary laser 320 has a wavelength (or range of wavelengths) ranging from approximately 300 nm to approximately 740 nm, approximately 400 nm to approximately 740 nm, approximately 530 nm to approximately 740 nm, approximately 300 nm to approximately 810 nm, approximately 400 nm to approximately 810 nm, or approximately 530 nm to approximately 810 nm. In various embodiments, the wavelength of laser beam 315 is in the UV or visible range, although the wavelength may extend up to approximately 810 nm for materials (e.g., aluminum) having absorption peaks in that range. In particular embodiments, the wavelength (or primary or center wavelength) of laser beam 315 may be, for example, approximately 810 nm, approximately 400—approximately 460 nm, or approximately 532 nm. In various embodiments, the primary laser 310 and/or the secondary laser 320 is a WBC laser emitting a broadband, multi-wavelength laser beam. In various embodiments, such lasers may have bandwidths ranging from, for example, approximately 10 nm to approximately 60 nm.

The table below shows some examples of various possible, non-limiting combinations of primary and secondary lasers 310, 320, as well as example target materials (i.e., materials to be processed) for each combination. (In the table, SHG is second harmonic generation.)

| Primary Laser | Secondary Laser | Example Target Materials |
| --- | --- | --- |
| 1 WBC DDL at 870-1000 nm | WBC DDL at 810 nm | Al, Steel, Fe |
| 2 WBC DDL at 870-1000 nm | WBC DDL at 400-460 nm | Cu, Ag, Au, Steel, Fe, Mo, Al |
| 3 WBC DDL at 870-1000 nm | SHG of Nd:YAG laser at 532 nm | Cu, Au, Steel, Fe, Mo, Al |
| 4 Fiber Laser at 1064 nm | WBC DDL at 400-460 nm | Cu, Ag, Au, Steel, Fe, Mo, Al |
| 5 Fiber Laser or DDL at NIR (e.g., 750-2500 nm) | CO Laser at 5 μm, $CO_2$ Laser at 10.6 μm, or Quantum Cascade Laser at 3-11 μm | Glass, Paper, Plastic |

As shown in FIG. 3, the primary laser 310, the secondary laser 320, and/or the laser head 340 may be responsive to a controller 350. For example, the controller 350 may initiate processes performed using the laser head 340 and switch on/off (and/or modulate the output power level of) primary laser 310 and secondary laser 320 accordingly. In various embodiments, the controller 350 may even control the motion of the laser head 340 relative to the workpiece via control of, e.g., one or more actuators. The controller 350 may also operate a conventional positioning system configured to cause relative movement between the output laser beam and the workpiece being processed. For example, the positioning system may be any controllable optical, mechanical or opto-mechanical system for directing the beam through a processing path along a two- or three-dimensional workpiece. During processing, the controller 350 may operate the positioning system and the laser system 300 so that the laser beam traverses a processing path along the workpiece. The processing path may be provided by a user and stored in an onboard or remote memory, which may also store parameters relating to the type of processing (cutting, welding, etc.) and the beam wavelengths (and sequences thereof) necessary to carry out that processing. In this regard, a local or remote database may maintain a library of materials and thicknesses that the system will process, and upon user selection of material parameters (type of material, thickness, etc.), the controller 350 queries the database to obtain the corresponding beam wavelengths and determine when and at what power level the primary laser 310 and secondary laser 320 will be utilized. The stored values may include beam wavelengths suitable for various processes of the material (e.g., piercing, cutting, welding, etc.), the type of processing, and/or the geometry of the processing path.

As is well understood in the plotting and scanning art, the requisite relative motion between the output beam and the workpiece may be produced by optical deflection of the beam using a movable mirror, physical movement of the laser using a gantry, lead-screw or other arrangement, and/or a mechanical arrangement for moving the workpiece rather than (or in addition to) the beam. The controller 350 may, in some embodiments, receive feedback regarding the position and/or processing efficacy of the beam relative to the workpiece from a feedback unit, which will be connected to suitable monitoring sensors.

In various embodiments, the controller 350 controls the on/off switching and/or the output power level of the primary laser 310 and secondary laser 320 based on sensed information related to the workpiece (e.g., its surface). For example, the laser system 300 may incorporate one or more optical and/or temperature sensors that detect when at least a portion of the surface of the workpiece is molten (via, e.g., a reflectivity change and/or the temperature reaching the melting point of the material; such sensors are conventional and may be provided without undue experimentation). In various embodiments, the secondary laser 320 is utilized to heat the workpiece surface until at least a portion of the surface of the workpiece is molten, or even to pierce through at least a portion of the thickness of the workpiece, and then the primary laser 310 is utilized to cut or weld the workpiece along a processing path originating from the at least partially molten area. In other embodiments, the controller 350 merely switches from the secondary laser 320 to the primary laser 310 after a timed delay, the duration of which may be estimated based on factors such as the type of material, the thickness of the material, the spot size of the secondary laser 320, etc.

In various embodiments, both the primary laser 310 and the secondary laser 320 are powered on during the entire process, but, when one of the beams is not being utilized (as described herein), that beam is diverted (e.g., diverted to a beam dump, or at least blocked from entering or exiting the laser head) rather than delivered to the surface of the workpiece. In such embodiments, the power level of the diverted beam may be decreased while it is being diverted and increased when it is directed to the workpiece. In this manner, power cycling of the various lasers, which is some embodiments may deleteriously affect the lifetime of the laser, may be avoided.

In various embodiments, both the primary laser 310 and the secondary laser 320 are utilized for both piercing (or melting) and cutting (or welding), but the power of the primary laser 310 is increased for the latter (and, thus, relatively decreased for the former) and the power of the secondary laser 320 is increased for the former (and, thus, relatively decreased for the latter). Such dual-beam embodiments may provide the advantage of higher quality cuts and piercings, due to the broader spectral band of the combined output beam, which significantly decreases laser coherence and speckle. In some embodiments, the primary laser 310 is not utilized until at least a portion of the workpiece surface is rendered molten by the secondary laser 320, and then both lasers 310, 320 are utilized for the subsequent cut or weld. Such embodiments will prevent or significantly reduce deleterious back reflections from the workpiece surface that might damage components (e.g., optical elements) of the laser system 300.

Embodiments of the invention may enable a user to process (e.g., cut or weld) a workpiece along a desired processing path, and the composition of the output beam (e.g., whether including beam 305, beam 315, or both), power level of the output beam (and/or of beam 305 and/or beam 315), and maximum processing speed is selected based on factors such as, but not limited to, the composition of the workpiece, the thickness of the workpiece, the geometry of the processing path, etc. For example, a user may select or preprogram the desired processing path and/or type (and/or other properties such as thickness) of the workpiece into the system using any suitable input device or by means of file transfer. Thereafter, the controller 350 may determine optimum output beam composition (e.g., switching between beams 305 and 315, and/or their relative power levels) as a function of location along the processing path. In operation, the controller 350 may operate the laser system and positioning of the workpiece to process the workpiece along the preprogrammed path, utilizing the proper output beam compositions for processes such as piercing, cutting, and welding. If the composition and/or thickness of the material being processed changes, the location and nature of the change may be programmed, and the controller 350 may adjust the laser beam composition and/or the rate of relative motion between the workpiece and the beam accordingly.

In addition, the laser system may incorporate one or more systems for detecting the thickness of the workpiece and/or heights of features thereon. For example, the laser system may incorporate systems (or components thereof) for interferometric depth measurement of the workpiece, as detailed in U.S. patent application Ser. No. 14/676,070, filed on Apr. 1, 2015, the entire disclosure of which is incorporated by reference herein. Such depth or thickness information may be utilized by the controller to control the output beam composition to optimize the processing (e.g., cutting, piercing, or welding) of the workpiece, e.g., in accordance with records in the database corresponding to the type of material being processed.

The controller 350 may be provided as either software, hardware, or some combination thereof. For example, the system may be implemented on one or more conventional server-class computers, such as a PC having a CPU board containing one or more processors such as the Pentium or Celeron family of processors manufactured by Intel Corporation of Santa Clara, Calif., the 680x0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described herein. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, as well as other commonly used storage devices. For embodiments in which the functions are provided as one or more software programs, the programs may be written in any of a number of high level languages such as FORTRAN, PASCAL, JAVA, C, C++, C#, BASIC, various scripting languages, and/or HTML. Additionally, the software may be implemented in an assembly language directed to the microprocessor resident on a target computer; for example, the software may be implemented in Intel 80x86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM.

Figure 4A:
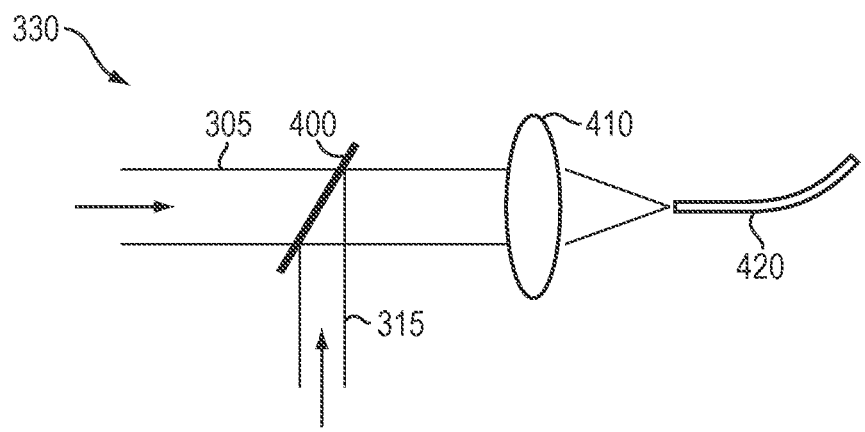
FIGS. 4A-4C are schematic diagrams of different configurations of or within a beam combiner in accordance with various embodiments of the present invention.
Figure 4B:
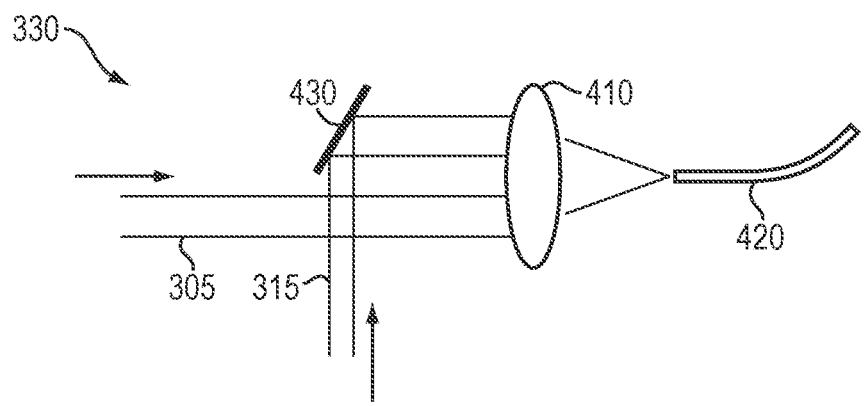
Figure 4C:
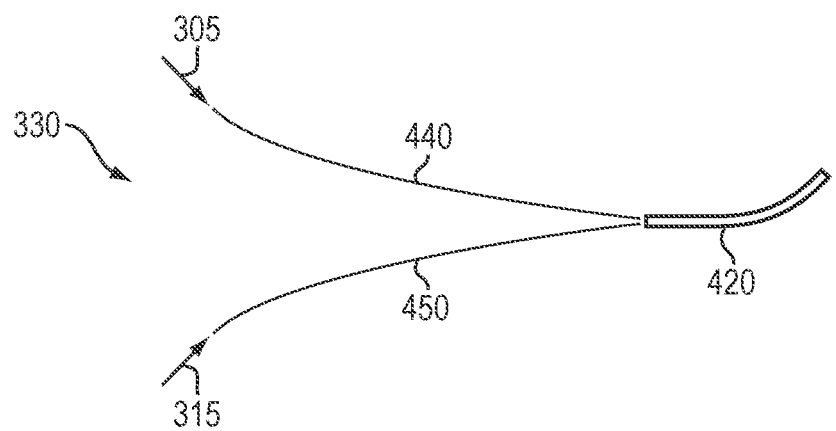

FIGS. 4A-4C schematically depict different configurations of or within combiner 330 in accordance with various embodiments of the present invention. For example, as shown in FIG. 4A, the combiner 300 may include, consist essentially of, or consist of a coarse-wavelength combiner featuring a dichroic mirror 400 that receives the beams 305, 315 and combines them into a beam that is focused by one or more focusing lenses 410 into a power delivery fiber 420. In various embodiments, the dichroic mirror 400 may be replaced or supplemented with a polarization beam splitter, which may polarization-combine the beams 305, 315 (for example, if both beams are linearly polarized). In another embodiment, as shown in FIG. 4B, the combiner 330 may be a spatial combiner within which one or more mirrors 430 receive the beams 305, 315, make them substantially parallel to each other, propagate them as close together spatially as possible, and focus them into the power delivery fiber 420. In yet another embodiment, as shown in FIG. 4C, the combiner 330 may be a fiber combiner, the beams 305, 315 may each be received into a separate optical fiber 440, 450. The optical fibers 440, 450 may be spliced (e.g., fusion spliced) into and with the power delivery fiber 420. In various embodiments, the optical connector 345 of FIG. 3 may include, consist essentially of, or consist of the fiber 420 shown in FIGS. 4A-4C. In various embodiments, one or both ends of any of the fibers 420, 440, 450 (e.g., a fiber end interfacing with air, free space, or the surrounding environment) may include an end cap (e.g., a glass block) thereon (e.g., attached by fusion). Such end caps may beneficially reduce input and/or output power density. Such end caps may have lengths ranging from, e.g., approximately 5 mm to approximately 50 mm. Any of the optical fibers 420, 440, 450 may have any of the various internal structures (e.g., one or more cores and one or more claddings) described herein.

In various embodiments, for example as shown in FIGS. 4A-4C, the primary and secondary laser beams may follow a common optical path to the workpiece, for at least a portion of the path between the lasers and the workpiece. In other embodiments, the primary and secondary laser beams may not be combined or follow a common optical path before reaching the workpiece. For example, the two laser beams may follow different optical paths to (e.g., within different delivery optical fibers) and be separately focused by the laser head 340 toward the same point on the workpiece surface. In various embodiments, the two laser beams may each be delivered to the laser head in its own dedicated delivery fiber, and at least portions of the two delivery fibers may be confined together within a shared protective sheath (e.g., a polymeric sleeve or coating).

Figure 5:
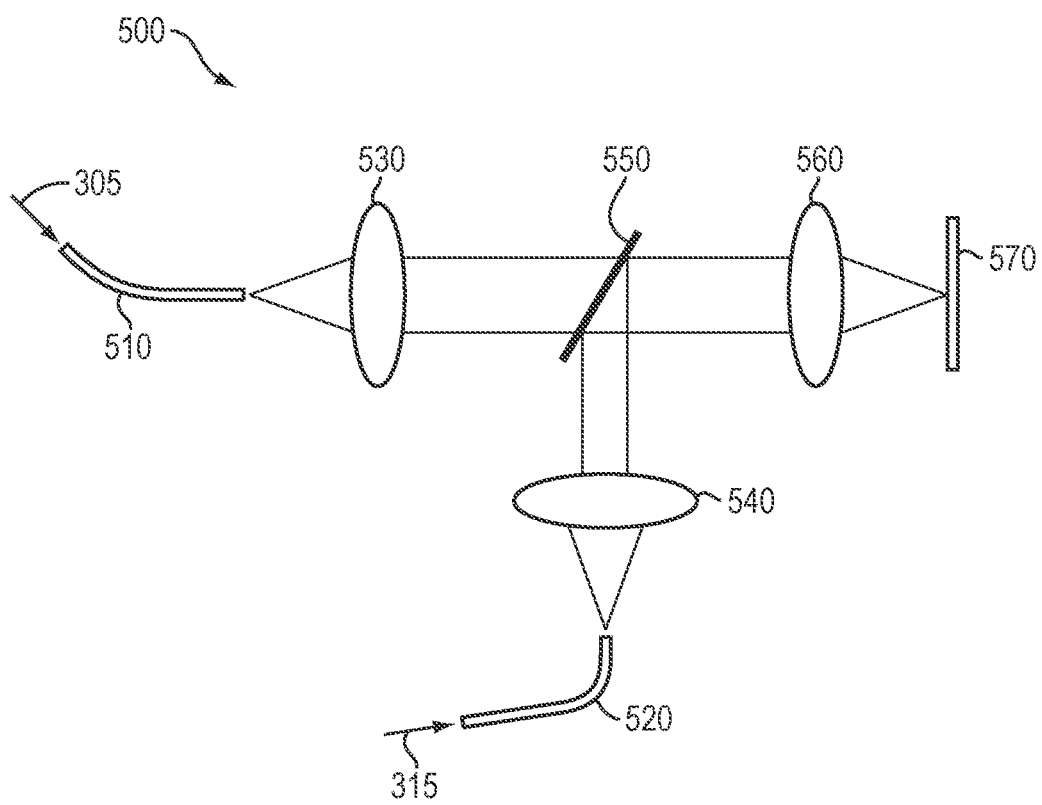
FIG. 5 is a schematic diagram of a combining laser head in accordance with various embodiments of the invention.

In various embodiments, the combiner 330 (or functionality thereof) is integrated into the laser head 340. FIG. 5 depicts a combining laser head 500 in which beams 305, 315 are delivered by optical fibers 510, 520, respectively, and collimated by collimators 530, 540, respectively. The collimated beams may be combined via, for example, a dichroic mirror 550. One or more focusing lenses (e.g., one or more spherical and/or cylindrical lenses) 560 may then focus beam 305, beam 315, and/or the combined beam onto a workpiece 570 for processing thereof.

Figure 6:
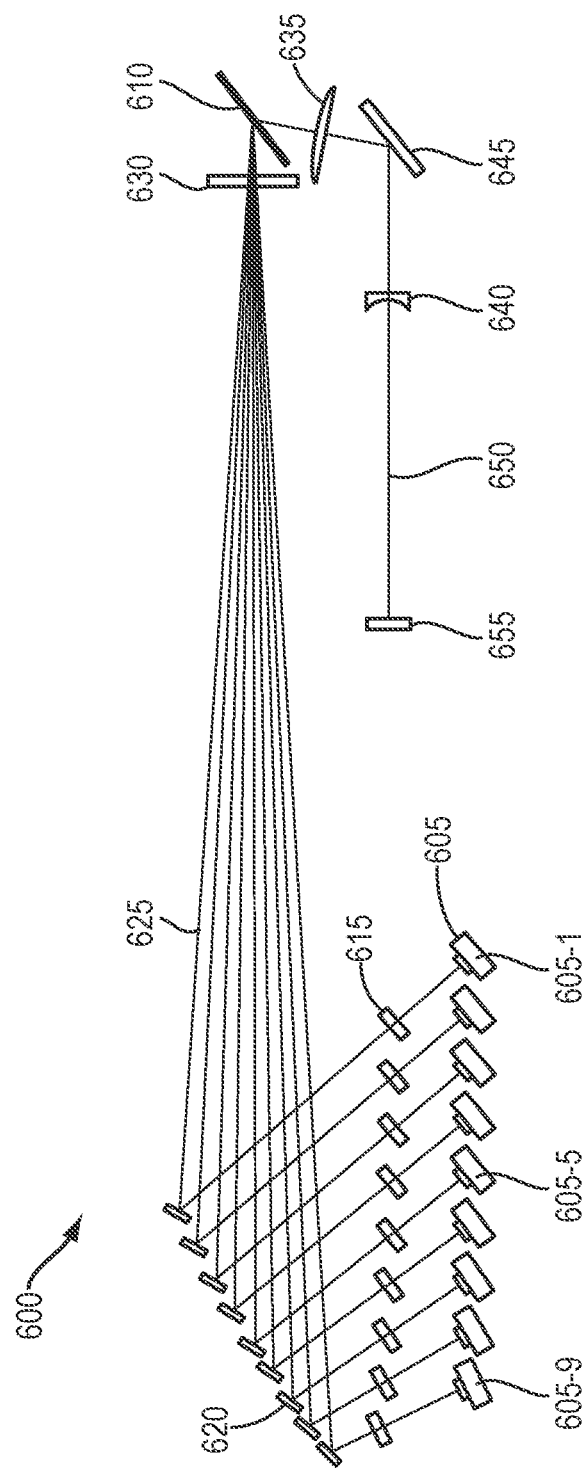
FIG. 6 is a schematic diagram of a wavelength beam combining (WBC) resonator in accordance with embodiments of the invention.

Laser systems and laser delivery systems in accordance with embodiments of the present invention and detailed herein may be utilized in and/or with WBC laser systems. Specifically, in various embodiments of the invention, multi-wavelength output beams of WBC laser systems may be utilized as one or both of the input beams for laser beam delivery systems for processing as detailed herein. FIG. 6 schematically depicts various components of a WBC laser system (or "resonator") 600 that may be utilized to form input beams used in embodiments of the present invention. In the depicted embodiment, resonator 600 combines the beams emitted by nine different diode bars (as utilized herein, "diode bar" refers to any multi-beam emitter, i.e., an emitter from which multiple beams are emitted from a single package). Embodiments of the invention may be utilized with fewer or more than nine emitters. In accordance with embodiments of the invention, each emitter may emit a single beam, or, each of the emitters may emit multiple beams. The view of FIG. 6 is along the WBC dimension, i.e., the dimension in which the beams from the bars are combined. The exemplary resonator 600 features nine diode bars 605, and each diode bar 605 includes, consists essentially of, or consists of an array (e.g., one-dimensional array) of emitters along the WBC dimension. In various embodiments, each emitter of a diode bar 605 emits a non-symmetrical beam having a larger divergence in one direction (known as the "fast axis," here oriented vertically relative to the WBC dimension) and a smaller divergence in the perpendicular direction (known as the "slow axis," here along the WBC dimension).

In various embodiments, each of the diode bars 605 is associated with (e.g., attached or otherwise optically coupled to) a fast-axis collimator (FAC)/optical twister microlens assembly that collimates the fast axis of the emitted beams while rotating the fast and slow axes of the beams by 90°, such that the slow axis of each emitted beam is perpendicular to the WBC dimension downstream of the microlens assembly. The microlens assembly also converges the chief rays of the emitters from each diode bar 605 toward a dispersive element 610. Suitable microlens assemblies are described in U.S. Pat. No. 8,553,327, filed on Mar. 7, 2011, and U.S. Pat. No. 9,746,679, filed on Jun. 8, 2015, the entire disclosure of each of which is hereby incorporated by reference herein.

In embodiments of the invention in which both a FAC lens and an optical twister (e.g., as a microlens assembly) are associated with each of the beam emitters and/or emitted beams, and SAC lenses (as detailed below) affect the beams in the non-WBC dimension. In other embodiments, the emitted beams are not rotated, and FAC lenses may be utilized to alter pointing angles in the non-WBC dimension. Thus, it is understood that references to SAC lenses herein generally refer to lenses having power in the non-WBC dimension, and such lenses may include FAC lenses in various embodiments. Thus, in various embodiments, for example embodiments in which emitted beams are not rotated and/or the fast axes of the beams are in the non-WBC dimension, FAC lenses may be utilized as detailed herein for SAC lenses.

As shown in FIG. 6, resonator 600 also features a set of SAC lenses 615, one SAC lens 615 associated with, and receiving beams from, one of the diode bars 605. Each of the SAC lenses 615 collimates the slow axes of the beams emitted from a single diode bar 605. After collimation in the slow axis by the SAC lenses 615, the beams propagate to a set of interleaving mirrors 620, which redirect the beams 625 toward the dispersive element 610. The arrangement of the interleaving mirrors 620 enables the free space between the diode bars 605 to be reduced or minimized. Upstream of the dispersive element 610 (which may include, consist essentially of, or consist of, for example, a diffraction grating such as the transmissive diffraction grating depicted in FIG. 6, or a reflective diffraction grating), a lens 630 may optionally be utilized to collimate the sub-beams (i.e., emitted rays other than the chief rays) from the diode bars 605. In various embodiments, the lens 630 is disposed at an optical distance away from the diode bars 605 that is substantially equal to the focal length of the lens 630. Note that, in typical embodiments, the overlap of the chief rays at the dispersive element 610 is primarily due to the redirection of the interleaving mirrors 620, rather than the focusing power of the lens 630.

Also depicted in FIG. 6 are lenses 635, 640, which form an optical telescope for mitigation of optical cross-talk, as disclosed in U.S. Pat. No. 9,256,073, filed on Mar. 15, 2013, and U.S. Pat. No. 9,268,142, filed on Jun. 23, 2015, the entire disclosure of which is hereby incorporated by reference herein. Resonator 600 may also include one or more optional folding mirrors 645 for redirection of the beams such that the resonator 600 may fit within a smaller physical footprint. The dispersive element 610 combines the beams from the diode bars 605 into a single, multi-wavelength beam 650, which propagates to a partially reflective output coupler 655. The coupler 655 transmits a portion of the beam as the output beam of resonator 600 while reflecting another portion of the beam back to the dispersive element 610 and thence to the diode bars 605 as feedback to stabilize the emission wavelengths of each of the beams.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

The invention claimed is:

1. A method of processing a workpiece utilizing a laser system comprising a primary laser configured to emit a primary laser beam and a secondary laser configured to emit a secondary laser beam, wherein a wavelength of the primary laser beam is different from a wavelength of the secondary laser beam, the method comprising:
during a first stage, directing at least the secondary laser beam to a surface of the workpiece, whereby energy of the secondary laser beam is absorbed by the workpiece; and
during a second stage after at least a portion of the surface of the workpiece reacts to absorption of energy of the secondary laser beam, (i) directing the primary laser beam and the secondary beam to the surface of the workpiece, and (ii) thereduring, causing relative movement between at least the primary laser beam and the workpiece, whereby the workpiece is cut along a processing path determined at least in part by the relative movement,
wherein an output power of the secondary laser beam during the second stage is lower than an output power of the secondary laser beam during the first stage.

2. The method of claim 1, wherein the primary laser beam is not directed to the surface of the workpiece during the first stage.

3. The method of claim 1, wherein the primary laser beam is directed to the surface of the workpiece during the first stage.

4. The method of claim 1, wherein the wavelength of the primary laser beam ranges from approximately 870 nm to approximately 11 µm.

5. The method of claim 1, wherein the wavelength of the primary laser beam ranges from approximately 870 nm to approximately 1064 nm.

6. The method of claim 1, wherein the wavelength of the primary laser beam ranges from approximately 870 nm to approximately 1000 nm.

7. The method of claim 1, wherein the wavelength of the secondary laser beam ranges from approximately 300 nm to approximately 810 nm.

8. The method of claim 1, wherein the wavelength of the secondary laser beam ranges from approximately 400 nm to approximately 810 nm.

9. The method of claim 1, wherein the wavelength of the secondary laser beam ranges from approximately 530 nm to approximately 810 nm.

10. The method of claim 1, wherein (i) the wavelength of the primary laser beam is longer than the wavelength of the secondary laser beam, and (ii) the workpiece comprises a metallic material.

11. The method of claim 10, wherein the workpiece comprises at least one of aluminum, copper, iron, steel, gold, silver, or molybdenum.

12. The method of claim 1, wherein (i) the wavelength of the primary laser beam is shorter than the wavelength of the secondary laser beam, and (ii) the workpiece comprises a non-metallic material.

13. The method of claim 12, wherein the workpiece comprises at least one of glass, paper, or plastic.

14. The method of claim 1, wherein an absorption, of the workpiece in the solid state, of the wavelength of the primary laser beam is less than 20%, less than 10%, or less than 5%.

15. The method of claim 1, wherein the primary laser beam is a multi-wavelength beam.

16. The method of claim 15, wherein the primary laser beam is emitted by a wavelength-beam combined beam emitter comprising:
  one or more beam sources emitting a plurality of discrete beams;
  focusing optics for focusing the plurality of beams toward a dispersive element;
  the dispersive element for receiving and dispersing the received focused beams; and
  a partially reflective output coupler positioned to receive the dispersed beams, transmit a first portion of the dispersed beams therethrough as the primary laser beam, and reflect a second portion of the dispersed beams back toward the dispersive element.

17. The method of claim 1, wherein the primary laser beam is emitted by a fiber laser, a direct-diode laser, or a solid-state laser.

18. The method of claim 1, wherein the secondary laser beam is a multi-wavelength beam.

19. The method of claim 18, wherein the secondary laser beam is emitted by a wavelength-beam combined beam emitter comprising:
  one or more beam sources emitting a plurality of discrete beams;
  focusing optics for focusing the plurality of beams toward a dispersive element;
  the dispersive element for receiving and dispersing the received focused beams; and
  a partially reflective output coupler positioned to receive the dispersed beams, transmit a first portion of the dispersed beams therethrough as the secondary laser beam, and reflect a second portion of the dispersed beams back toward the dispersive element.

20. The method of claim 1, wherein the secondary laser beam is emitted by a gas laser, a direct-diode laser, or a solid-state laser.

21. The method of claim 1, further comprising, before initiating the second stage, determining that the at least a portion of the surface of the workpiece is molten based on at least one of a reflectivity or a temperature of the surface of the workpiece.

22. The method of claim 1, wherein a hole is formed through a thickness of the workpiece during the first stage and before the second stage.

23. The method of claim 1, wherein a hole is not formed through a thickness of the workpiece before initiation of the second stage.

* * * * *